May 27, 1958 E. W. BRYDON 2,836,141
CLEAT
Filed March 26, 1956 2 Sheets-Sheet 1

INVENTOR
EDWARD W. BRYDON
By Douglas S. Johnson
ATTY

May 27, 1958  E. W. BRYDON  2,836,141
CLEAT

Filed March 26, 1956  2 Sheets-Sheet 2

INVENTOR
EDWARD W. BRYDON
by Douglas S. Johnson
ATTY.

United States Patent Office 2,836,141
Patented May 27, 1958

2,836,141

CLEAT

Edward W. Brydon, Weston, Toronto, Ontario, Canada

Application March 26, 1956, Serial No. 573,782

7 Claims. (Cl. 114—218)

This invention relates to improvements in cleats or chocks such as are used on boats, docks or in other applications where it is desired to secure the free end or bight or loop of a rope or line.

With present cleats the securing of a rope or line is dependent essentially upon the ability of the person to tie a proper knot which will not work loose. That is, the security of the tie fixing the line about the cleat resides in the skill with which it is effected.

It is the object of the present invention to provide a cleat or chock having universal application which will greatly simplify and facilitate the securement of a rope or line thereto. In particular it is the object to provide a cleat which itself will form the means of ensuring that even the most simplified knot or tie is secured against working loose.

Again it is another important object to eliminate the present serious problem of "jump off" of looped rope portions secured to the cleat. In this connection it is an object to provide a cleat capable of restraining the bight of a looped rope or line portion encircling the cleat against accidentally slipping free over the head of the cleat on slackening of the line.

Another important object is to provide a cleat as aforesaid to be manufactured much more economically than present cleats.

Still another important object is to provide a cleat which will not only have universal application as a single cleat or chock but will also be adapted as a constituent element for forming without modification double cleats, bow plates and like fittings.

The principal feature of the invention resides in forming the cleat to have a slotted waist portion connecting the head to the mounting base.

More particularly according to the preferred form of the invention the cleat is of rolled form having an elongated hood-like head formation connected at one side by a reduced generally upright waist portion to an elongated flat mounting base disposed beneath the head, the waist portion having a generally elongated slot or eye therethrough extending longitudinally of the head and mounting base.

The slot or eye preferably has a width approximating the diameter and a length approximately twice the diameter of the rope or line with which the cleat is to be used.

With the construction described with respect to the preferred embodiment of the invention, the cleat head overlies the mounting base to form a horizontal channel therebetween open at one side and closed to the other by the slotted waist portion. It is a further feature of the invention to incline the head of the cleat longitudinally of the mounting base to provide a taper to the channel to aid in the jamming of a rope or line threaded through the eye or slot of the waist.

It is a further feature of the invention to combine two or more of the cleats above described to form bow plates, full or double cleats or other described fittings.

These and other objects and features will become apparent from the following descripton taken in conjunction with the accompanying drawings, in which.

Figure 8:
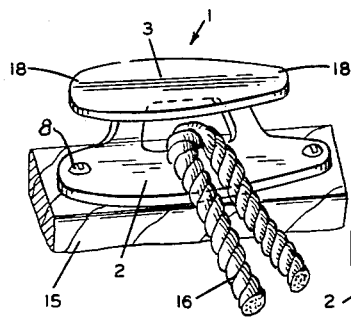
Figure 9:
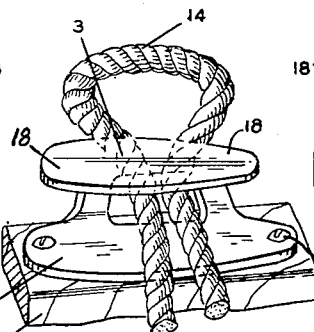
Figure 10:
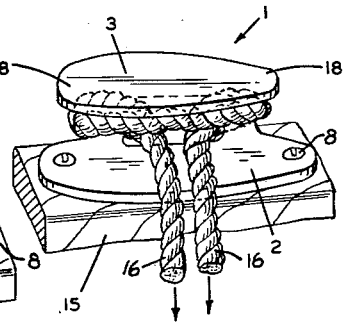

Figures 8 to 10, inclusive, are perspective views illustrating the steps in locking the bight of a looped line on the cleat.

Figure 11:
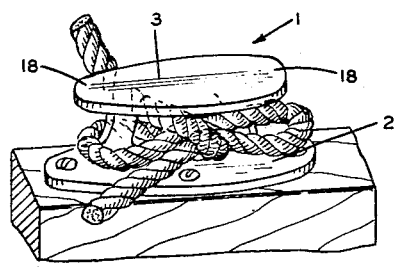

Figure 11 is a perspective view of an alternative form of quick release hitch which can be effected with the free end of a line.

Figure 12:
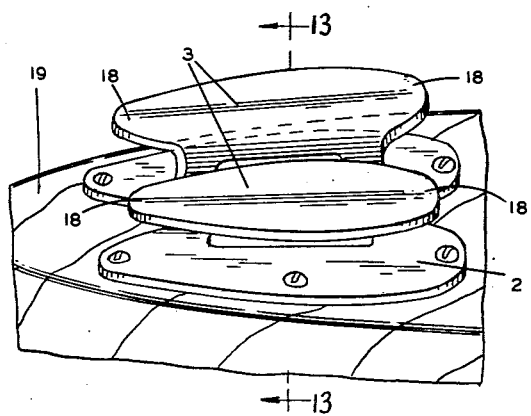

Figure 12 is a perspective view of a pair of cleats disposed in side-by-side relation, for instance, on a boat deck, to form a full cleat or bow plate.

Figure 13:
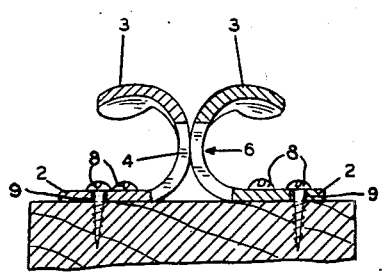

Figure 13 is a section on the line 13—13 of Figure 12.

Referring first to Figures 1 to 4, the cleat generally designated as 1 comprises a rolled metal form having a flat elongated base portion 2 and superimposed above the base portion an elongated head portion 3. The head portion 3 is elongated in the same direction as the base 2, but is shown somewhat smaller than the base 2. The head and base portions are connected by an integral waist portion 4 having a length reduced from that of the base and head portions.

Figure 1:
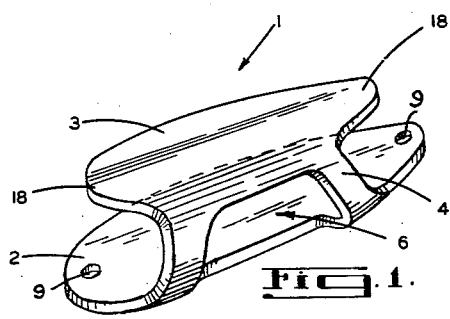
Figure 1 is a perspective view taken from the rear of a cleat constructed in accordance with the invention.
Figure 2:
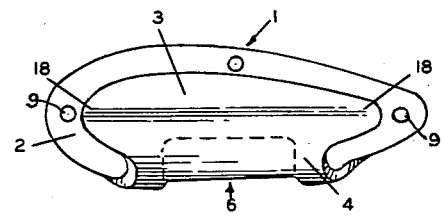
Figure 2 is a plan view of the cleat of Figure 1.
Figure 4:
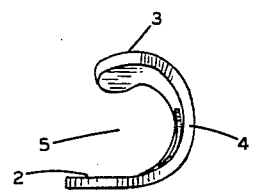
Figure 4 is an end elevational view.

As best seen in Figure 4, the cleat 1 defines a channel formation 5 open at one side and closed at the other by the reduced upstanding waist portion 4 which forms the connecting web connecting the walls of the channel formed by the base and head portions 2 and 3 respectively, at one longitudinal side thereof. The reduced waist portion 4 is formed with an eye or channel 6 therethrough, the purpose of which will hereinafter more fully appear.

Figure 3:
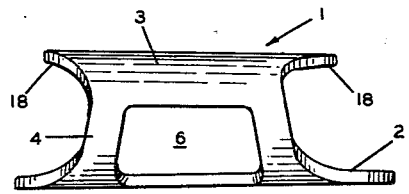
Figure 3 is a rear elevational view of the cleat.

Preferably, as shown in Figure 3 particularly, the head portion 3 is inclined with respect to the base portion 2 to provide a taper to the channel 5 which decreases in moving from left to right of Figure 3.

Figure 5:
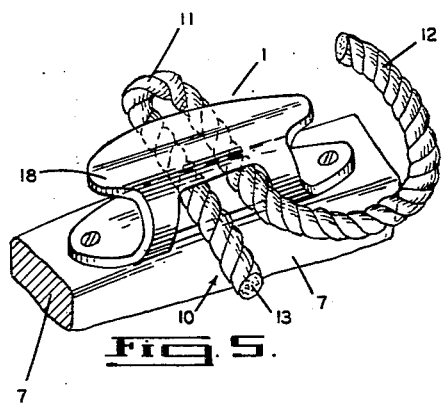
Figure 5 is a perspective view of the cleat of Figures 1 to 4, illustrating the first step in securing a line thereto by means of a quick release hitch.
Figure 6:
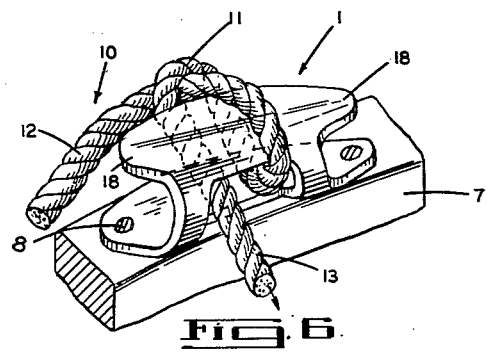
Figure 6 is a view similar to Figure 5, but showing a subsequent step in the effecting of the hitch.
Figure 7:
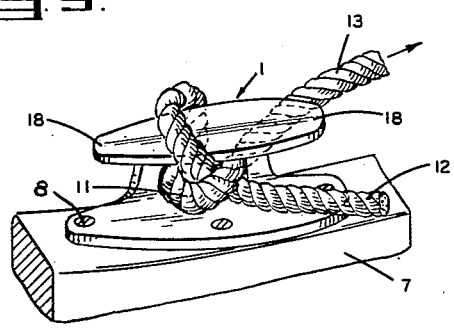
Figure 7 is a perspective view of the cleat taken from the opposite side from Figures 5 and 6 and showing the completed hitch jammed in a locked positon.

As shown in Figures 5 to 7, the cleat may, for instance, be fastened to the gunwale 7 of a boat by means of screws 8 introduced through suitable openings 9 in the base portion 2 of the cleat. A rope or line 10 may be quickly secured to the cleat by means of a quick release hitch as illustrated in the latter figures. As shown in Figure 5, the line 10 may be passed through the eye or channel 6 to present a loop 11, and the free end 12 of the line may be inserted through the loop 11 thus formed as shown in Figure 6, and upon pulling in the direction of the arrow indicated in Figures 6 and 7, the rope may be jammed beneath the head portion 3 as illustrated in Figure 7. This simple hitch, however, may be quickly released by forcing the rope portion 13 back through the eye or channel 6 or, alternatively, pulling on the rope portion 12 to release the jam occurring at the eye 6 and then freeing the rope end 12 from the loop 11.

While, of course, the cleat is useful with a number of sizes of ropes or lines 10, the eye or slot 6 which extends longitudinally of the cleat, that is, in the longitudinal direction of the base and head portions, has a width approximately equal to the largest diameter of rope with which the cleat is to be used, and a length of the order of twice its width. The width of the eye or slot 6 is in the vertical direction with the cleat disposed in the manner illustrated in Figures 1 to 7, and while the slot can readily allow the passage of two diameters of the rope or line as illustrated in Figure 5, in side by side relation to form the loop 12, it is impossible to draw the four diameters of the line through the eye which would be necessary to release the locked jam hitch of Figure 7 by tension on the line portion 13 in the direction of the arrow.

Figures 8 to 10 illustrate the manner in which the looped end 14 of a line may be anchored on the cleat, for instance, for the purpose of fastening a fender to the combing 15 of a boat. With the looped end 14 threaded through the eye or slot 6 as illustrated in Figure 9, and then looped over the head 3 of the cleat and forced beneath the head to overlie the line portion 16, a locking jam is effected upon pulling of the line portions 16 in the direction of the arrows in Figure 10. Thus the channel formation 5 of the cleat forms a restriction, between the base and head portions 2 and 3 of which the double thicknesses of the looped end 14 and line portions 16 are jammed.

The provision of the relatively thin web constituted by the reduced waist portion 4 and the provision of the eye 6 therein, enables the rope portions to be sharply bent or kinked so that there will be no danger of slippage or accidental working loose.

By having the waist portion 4 reduced the head 3 presents projecting end portions 18 which constrain the rope or line portions passing therebeneath from moving upwardly and "jumping off" the head of the cleat to further augment the locking jam effect obtainable.

The base portion 2 and the head portion 3 are preferably spaced a distance corresponding to the length of the slot 6 or in other words to accommodate at least two rope or line diameters as will be seen particularly in Figures 10 and 11. The tapering of the channel formation 5 also assists the jamming action as an increasing jam is effected along the length of the channel. With this arrangement the locking effect at the narrowed end of the channel can be relied on to hold the line securely against jump off and yet the line portion 16 adjacent the wider end of the channel can be forced through the eye 6 in the opposite direction to the arrow of Figure 10 without excessive effort to release the looped end 14 when desired.

Figure 11 illustrates an alternative method of effecting a quick release hitch with the cleat.

Figures 1 to 11, inclusive, illustrate a single cleat 1. As illustrated in Figures 12 and 13, two cleats 1 may be paired together to form a double or a full cleat, or the cleats may be prepared to form a bow plate on the bow 19 of a boat.

In addition to the uses illustrated, it will be appreciated that the cleat can equally as well be used as a mooring cleat on a dock or may constitute a chock or may have many other applications where it is desired to temporarily secure a line or rope against jump off or accidental working loose in a simple and easy manner.

Because of the jamming effect obtained as described above, the advantages of positive securement of the line can be obtained with the most simplified form of hitch or knot and no special knot, such as required by present cleats, is necessary.

Because of the simple rolled formation of the cleat, it will be understood that it can be formed as a simple, inexpensive stamping or as an inexpensive casting, and yet form a sturdy structure with universal application.

It will be understood that the specific details of the cleat may be altered from the preferred embodiment of the invention illustrated without departing from the spirit of the invention.

The embodiments of the invention in which an exclusive property or privilege is claimed are defined as follows:

1. A cleat structure comprising a mounting base having at one edge an upstanding waist portion and a head supported by said waist portion above and disposed over said base, said waist portion having an eye therethrough.

2. A cleat structure comprising an elongated mounting base having at one side thereof an upstanding waist portion, and an elongated head portion supported by said waist portion above and disposed over and extending longitudinally of said base to define an elongated channel therebetween open at one side opposite to said waist portion, said waist portion having a slot therethrough.

3. A cleat as claimed in claim 2 in which said slot comprises an elongated slot having its length in the longitudinal direction of said head and base.

4. A cleat as claimed in claim 3 in which said head is inclined longitudinally of said base whereby said elongated channel is provided with a longitudinal taper.

5. A cleat as claimed in claim 2 in which said slot comprises an elongated slot having its length in the longitudinal direction of said head and base and its width in the direction of the height of said upstanding waist portion, the length of the slot being approximately twice its width whereby the slot is adapted to accommodate in side by side relation two diameters of a rope whose diameter will just pass through the slot.

6. A cleat as claimed in claim 5 in which the separation between head and base is approximately equal to the length of said slot.

7. A cleat comprising a channel like member disposed on its side and having as a lower wall an elongated mounting base and as an upper wall an elongated head disposed in spaced relation above and extending longitudinally of said base, said upper and lower walls being joined at one side by a substantially upright web portion of reduced length from said base and head in the direction of their longitudinal dimensions to form a reduced cleat waist portion, said waist portion having a longitudinal slot therein extending in the longitudinal direction of said base and head.

References Cited in the file of this patent
UNITED STATES PATENTS
1,034,222    Dych _____ July 30, 1912